United States Patent [19]
Droll

[11] 3,717,918
[45] Feb. 27, 1973

[54] INSERTING TOOL FOR INSERTING COILS INTO STATOR GROOVES

[76] Inventor: Hans Droll, 6 Bergen-Enkheim, Nordring, Germany

[22] Filed: June 7, 1971

[21] Appl. No.: 150,431

[30] Foreign Application Priority Data

June 6, 1970 Germany.....................P 20 27 979.2

[52] U.S. Cl. ...............................................29/205 R
[51] Int. Cl. ...............................................H02k 15/06
[58] Field of Search.............29/205 D, 205 R, 203 R

[56] References Cited

UNITED STATES PATENTS

| | | | |
|---|---|---|---|
| 3,324,536 | 6/1967 | Hill | 29/205 R |
| 3,559,268 | 2/1971 | Droll | 29/205 D |

*Primary Examiner*—Thomas H. Eager
*Attorney*—Larson, Taylor and Hinds

[57] ABSTRACT

A device for placing pre-wound coils into stator grooves including a generally circular stripper member movable through the stator. Projections are arranged about the periphery of the stripper member with fingers located in the slots formed between the projections. Some fingers, and preferably at least one finger adjacent each tooth which contains a prewound coil to be placed into the stator is fixed onto the stripper member for movement therewith as the latter moves through the stator. A guide rod fixed relative to the stator is placed between each fixed mounting finger and the inner periphery of the stator to prevent wear of the fixed mounting finger as the stripper member moves through the stator.

5 Claims, 2 Drawing Figures

PATENTED FEB 27 1973 3,717,918

INVENTOR
HANS DROLL

Larson, Taylor and Hinds
ATTORNEYS

INSERTING TOOL FOR INSERTING COILS INTO STATOR GROOVES

RELATED APPLICATION

This is an improvement of the invention in my previous application Ser. No. 869,286, filed Oct. 24, 1969, now U.S. Pat. No. 3,559,268, issued Feb. 2, 1971.

BACKGROUND OF THE INVENTION

This invention relates to the production of stators for electrical machines and the like, and in particular it relates to a new and improved device for placing prewound coils into stator grooves.

A known apparatus for inserting pre-wound coils into stator grooves includes a star-shaped stripper member having slots formed in its outer periphery between radially extending projections, the said stripper member being movable parallel to its axis and slidable relative to elongated fingers located in said slots. Pre-wound coils are initially placed onto these fingers as the latter extend through the center of a stator. The stripper member is then moved through the center of the stator, sliding along the fingers, to remove the coils from the fingers and insert the same into the stator grooves.

An apparatus of this general type is illustrated in the Hill U.S. Pat. No. 3,324,536, issued June 13, 1967.

However, the previously known apparatus suffers from the disadvantage that the wires of the pre-wound coils become pinched as they are moved from the surface of the stripper member into the stator grooves. This pinching occurs whenever the diameter of the pre-wound coils is too large relative to the width of the groove opening of the stator or relative to the distance between the two adjacent fingers which support a given pre-wound coil for guiding the same into a stator groove upon movement of the stripper member.

My previous application, now U.S. Pat. No. 3,559,268 provided a solution to the problems of the prior art by providing a device wherein friction between the wires of the pre-wound coil and the fingers of the device is reduced during insertion of the coils. To achieve this result, at least one of the two fingers adjacent each coil at the periphery of the stripper member is fixed to the stripper member for movement therewith. Since these fixed fingers will move with the stripper member, there will be no relative movement of the same with respect to the pre-wound coils carried along by the stripper member as the coils are inserted into the stator grooves. Thus, there will be no friction between these fingers and the coils tending to push the wires of the coil one over the other thereby pinching them.

Although the invention of my previous patent represents a significant improvement over the previously known apparatus, it has been found that this new arrangement suffers from the disadvantage that the fixed mounting fingers, that is those attached to the stripper member, are subjected to considerable wear as they glide along the sharp edges of the stator teeth as the stripper member moves through the stator. It will be remembered that stators are normally made up of a plurality of laminates. Hence, the inner periphery of the stator, especially the sharp corners between the inner periphery of the stator and the stator grooves often have the appearance of the edge of a saw. Thus, there exists a need for reducing or eliminating the wear to which the fixed mounting fingers of my previous patent are subjected as the stripper member moves through the stator.

SUMMARY OF THE INVENTION

Thus, it is a purpose of the invention to provide an improved device of the type including a stripper member and a plurality of fingers for inserting pre-wound coils into the stator grooves, which device includes fixed mounting fingers attached to the stripper member and wherein means are provided for eliminating wear to which the fixed mounting fingers are subjected as the stripper member moves through the stator.

This purpose is achieved in accordance with the present invention by providing a guide means located between the fixed mounting fingers and the inner periphery of the stator and positioned to prevent contact of the fixed mounting fingers with the inner periphery of the stator.

In a preferred arrangement, the guide means is in the form of an elongated guide rod which is fixed relative to the stator and along which the fixed mounting fingers are guided as the stripper member moves through the stator.

In a stripper member of the general type to which the present invention relates, each mounting finger, whether of the fixed or slidable type, normally faces a stator tooth which is that portion of the inner periphery of the stator between adjacent stator grooves. The mounting fingers normally are wider than the stator teeth which they face in order to guide the pre-wound coils past the sharp corners formed by the inner periphery of the stator and the radially extending walls of the stator grooves. In a preferred arrangement of the present arrangement, the guide means are made slightly wider than the stator teeth which they oppose in order to prevent engagement of the respective fixed mounting fingers with any portion of its opposing stator tooth, especially the sharp edges formed by that stator tooth with adjacent stator grooves. Further, to prevent damage of the pre-wound coils as they move into the stator grooves, the mounting fingers are preferably U-shaped in cross-section with the legs of the U enclosing the guide rod and extending beyond the said sharp corners and slightly into the stator grooves.

Thus, it is an object of this invention to provide a new and improved device for inserting pre-wound coils into stator grooves.

It is another object of this invention to provide a new and improved device for inserting coils into stator grooves wherein at least one of the two fingers supporting a given coil are fixed to the stripper member for movement therewith, and wherein wear between this fixed mounting finger and the stator is substantially reduced or eliminated.

It is another object of this invention to provide a new and improved device for inserting coils into stator grooves wherein wear on mounting fingers attached to a stripper member is prevented by the provision of guide means located between the fixed mounting fingers and the inner periphery of the stator.

It is another object of this invention to provide a new and improved device for inserting coils into stator grooves wherein wear on mounting fingers attached to the stripper member is substantially reduced or eliminated by constructing these fixed mounting fingers with a U-shaped cross-section and providing between the legs of the U elongated guide rods which separate these fixed mounting fingers from the inner periphery of the stator.

Other objects and advantages of the present invention will become apparent from the detailed description to follow, together with the accompanying drawings.

BRIEF DESCRIPTION OF THE DRAWINGS

There follows a detailed description of a preferred embodiment of the invention to be read together with the accompanying drawings. It is to be understood that the description and the drawings are provided only to illustrate a preferred embodiment of the invention.

DETAILED DESCRIPTION OF THE PREFERRED EMBODIMENT

Figure 1:
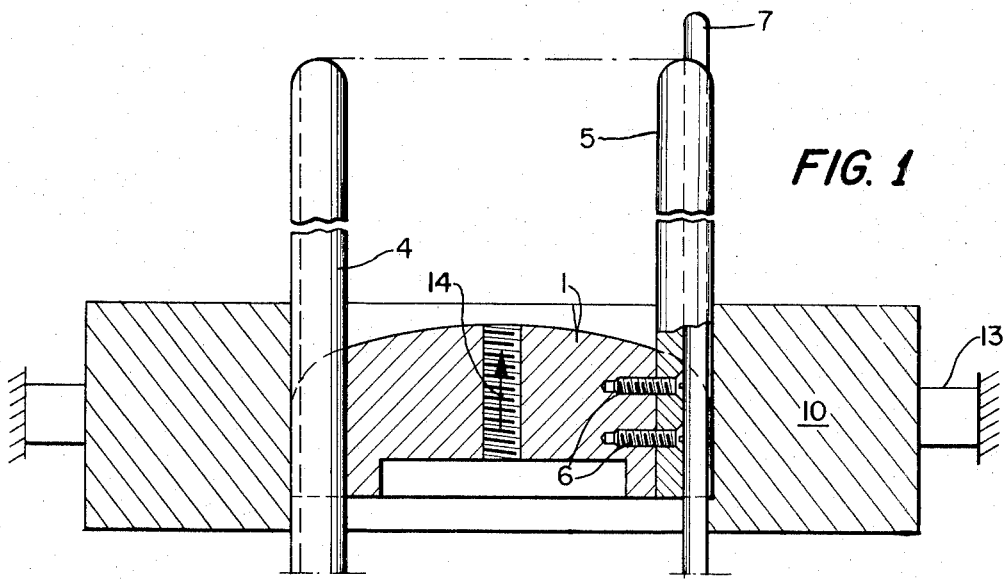
FIG. 1 is a sectional view taken along line 1—1 of FIG. 2 and showing a device of the present invention in use with respect to a stator.

Referring now to the drawings, like elements are represented by like numerals throughout the two views.

The invention includes a star-shaped stripper member 1 having a plurality of projections 3 extending radially outwardly therefrom with peripheral slots 2 formed between the projections. Also shown in the figures is a stator 10 having a plurality of grooves 11 therein, each groove being located directly across from the outer periphery of a projection 2. Also shown in FIG. 1 are six separate pre-wound coils 8a through 8f. The outer portions of each of these coils are to be inserted into the grooves 11 having subscripts corresponding to the subscript of the coil. For example, coil 8a is to be inserted into slots 11a, coil 8b is to be inserted into the two slots 11b, etc. A holding means 13, illustrated symbolically in FIG. 1, is provided for stationarily supporting the stator during the coil insertion operation.

The device includes a plurality of mounting fingers located within the slots 3 of the stripper member 1. In accordance with the main feature of my previous patent, some of these mounting fingers 5 are rigidly secured to the stripper member 1 by suitable means such as screws 6. The devices may also include a plurality of previously known mounting fingers 4 which are fixed with respect to a base (and hence fixed with respect to the stator 10) and slidable within the slots 2 as the stripper member moves upwardly through the stator in the direction of the arrow 14 in FIG. 1.

The apparatus as described above fulfills the requirements of moving the pre-wound coils into the grooves without twisting the same, as described in my U.S. Pat. No. 3,559,268. However, the fixed mounting fingers are subjected to considerable wear. When one considers that a stator is actually comprised of a plurality of laminates, it will be understood that the inner periphery of the stator taken in a direction parallel to its axis, presents a saw tooth profile. It will thus be appreciated that the fixed mounting fingers which slide relative to the stator are thus subjected to the considerable wear of this saw toothed profile. The wear is especially significant at the sharp corners formed between the inner periphery of the stator and the radial walls of adjacent stator grooves. To eliminate the effects of this wear on the fixed mounting fingers without eliminating the advantages of the latter, in accordance with the present invention, each fixed mounting finger 5 has been re-designed with a U-shaped cross-section. Guide rods 7 are then placed into this cross-section and are fixed relative to the stator during operation. Although the guide rods 7 appear in the figures to be the same width as the stator teeth which they oppose, in fact each guide rod will be slightly larger than the stator tooth which it opposes, thereby protecting the fixed stripper member 5 not only from the inner periphery of the stator tooth but from the sharp corners formed by the inner periphery of the stator tooth and the radially extending walls of the adjacent stator grooves. The U-shaped fixed mounting fingers 5 are further designed so that the legs of the U extend slightly into the stator grooves, thereby guiding the pre-wound coils 8 by this sharp corner without damage.

Figure 2:
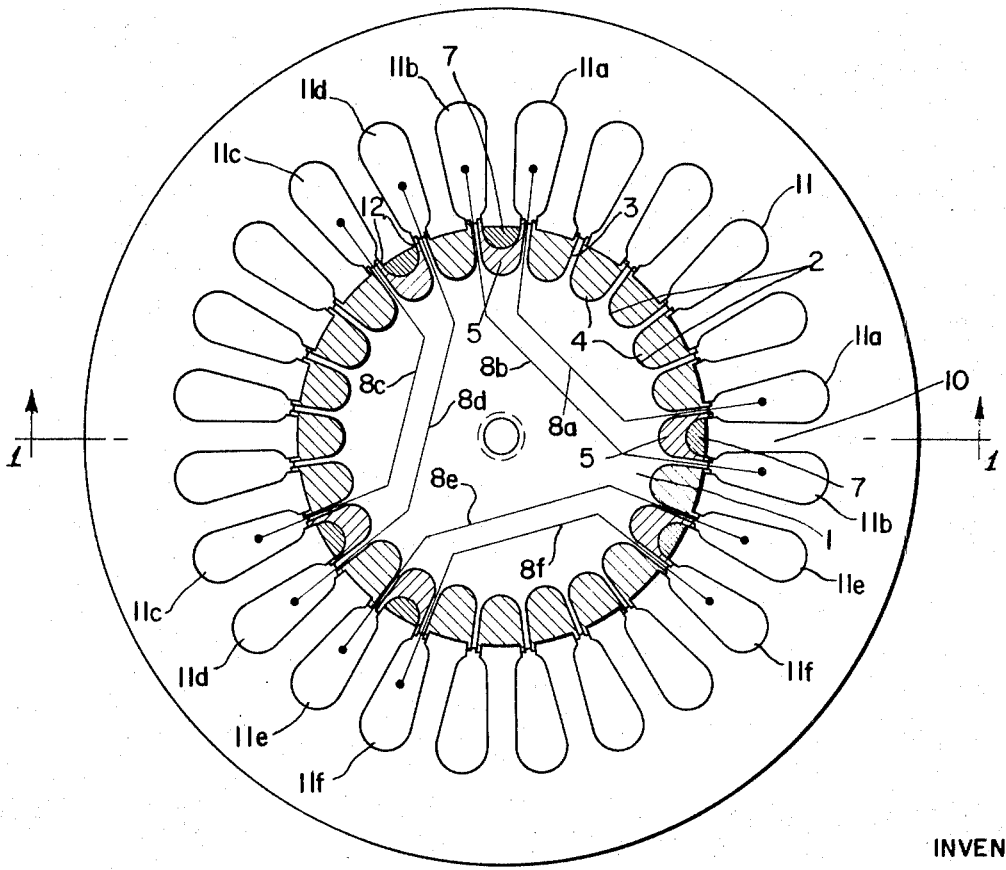
FIG. 2 is a plan view of FIG. 1 but with the addition of schematic representations of pre-wound coils.

The device of the present invention operates as follows. Before the stator 10 is brought into the vicinity of the stripper member, the stripper member is first arranged with all of the required mounting fingers and guide rods projecting upwardly therefrom. The pre-wound coils are then located on the stripper member 1 so that the outer portions of the coils each lie on a projection 3 between slots 2, each of which contains a fixed mounting finger 5 or a slidable mounting finger 7. See FIG. 2. Although it is most desirable to use only fixed mounting fingers 5, as explained in my previous patent, it has been found economically advantageous and technically satisfactory if only one of the two mounting fingers adjacent each projection 3 contain a fixed mounting finger 5. This is the case illustrated in FIG. 2 wherein six fixed mounting fingers 5 are shown and the remainder of the mounting fingers are the sliding type 4 which are fixed to the base of the apparatus and hence slidable relative to rather than fixed to the stripper member 1.

With the coils in place between the mounting fingers of the stripper member, the stator 10 is placed above the stripper member with its grooves lying each across from one projection 3 of the stripper member 1. In the present case, the grooves 11a lie across and are hence radially aligned with the projections 3 containing the outer portions of the coil 8a, the grooves 11b lie across from and are hence radially aligned with the projections 3 containing the outer portions of coils 8b, etc. The stripper member 1 is then moved upwardly through the stator 10 as the outer portion of the projections 3 and the rounded upper portion of the stripper member 1 force the prewound coils into their respective grooves. The figures illustrate this operation just as the stripper member 1 is passing through the stator 10. During this movement, as viewed in FIG. 1, the mounting fingers 4 and the guide rods 7 would appear stationary as the stripper member 1 and the mounting fingers 5 fixed thereto move through the stator 10 in the direction of the arrow 14.

As explained in my previous patent, since some mounting fingers are connected to the stripper member 1 for movement therewith, in this case the friction between the wires of the coils 8 and the mounting fingers are either considerably lowered or avoided altogether. Further, in accordance with the features of the present invention, as the fixed mounting fingers 5 move through the stator 10, wear on these fixed fingers 5 is substantially reduced because these fingers 5 slide along the radial inner surface of the guide rods 7 as the latter prevent the radial outer parts of the fixed finger 5 from engaging and being damaged by the inner periphery of the stator teeth.

Although the invention has been described in considerable detail with respect to a preferred embodiment thereof, it will be apparent that the invention is capable of numerous modifications and variations apparent to those skilled in the art, without departing from the spirit and scope of the invention.

I claim:

1. A device for placing pre-wound coils into grooves of stators or the like comprising: a stripper member mounted for movement through a stator, said stripper member including projections positioned about the periphery of the stripper member and extending outwardly therefrom such that in operation each said projection is positioned across a stator groove, finger members located in planes passing between said projections and extending in a direction parallel to the direction of relative movement between the stripper member and the stator; one finger being located on each side of each projection which has a pre-wound coil associated with it for placement into a stator groove; at least one of said fingers on one side of a given projection which has a pre-wound coil associated with it being fixed to the stripper member for movement therewith through the stator to reduce relative frictional movement between the pre-wound coil associated with the said given projection and its adjacent fingers; and including a guide means located between the said fixed mounting finger and the inner periphery of the stator such that as the stripper member moves through the stator, at least a portion of the radial outer side of the fixed mounting finger is prevented by the guide means from engaging the inner periphery of the stator, said guide means being an elongated guide rod fixed against movement relative to the stator and extending in the direction of relative movement between the stripper member and the stator, said fixed mounting finger being guided along the guide rod as the stripper member moves through the stator.

2. A device according to claim 1, wherein the stator includes stator teeth between adjacent stator grooves, each mounting finger facing a stator tooth, and wherein each guide means is slightly wider than the inner periphery of the stator tooth which it faces.

3. A device according to claim 1, wherein said fixed mounting fingers are essentially U-shaped in cross-section, the legs of the U enclosing the guide means.

4. A device according to claim 3, wherein the stator includes stator teeth between adjacent stator grooves, each mounting finger facing a stator tooth, and wherein the legs of the U project into the stator grooves adjacent the stator tooth which it faces.

5. A device according to claim 1, the stator including stator teeth between adjacent stator grooves, each mounting finger facing a stator tooth, and wherein each guide means is slightly wider than the inner periphery of the stator tooth which it faces, said fixed mounting fingers being essentially U-shaped in cross-section, the legs of the U enclosing the guide means and projecting slightly into the stator grooves adjacent the tooth it faces.

* * * * *